United States Patent [19]

Smith, deceased et al.

[11] Patent Number: 4,843,202

[45] Date of Patent: Jun. 27, 1989

[54] MAGNETRON WITH FREQUENCY CONTROL FOR POWER REGULATION

[75] Inventors: Peter H. Smith, deceased, late of Anchorage, Ky., by Pamela Sheila Smith, Executor; Flavian Reising, Jr., Louisville, Ky.

[73] Assignee: General Electric Company, Louisville, Ky.

[21] Appl. No.: 138,135

[22] Filed: Dec. 28, 1987

[51] Int. Cl.⁴ .............................................. H05B 6/64
[52] U.S. Cl. .............................. 219/10.55 B; 363/17; 363/98; 363/132
[58] Field of Search .......................... 363/17, 98, 132; 219/10.55 B

[56] References Cited

U.S. PATENT DOCUMENTS

| | | | |
|---|---|---|---|
| 3,735,237 | 5/1973 | Derby | 363/8 |
| 4,071,812 | 1/1978 | Walker | 363/80 |
| 4,204,266 | 5/1980 | Kammiller et al. | 363/98 |
| 4,281,372 | 7/1981 | Kornrumpf | 363/20 |
| 4,318,165 | 3/1982 | Kornrumpf et al. | 363/21 |
| 4,338,658 | 7/1982 | Toy | 363/17 |
| 4,420,668 | 12/1983 | Larson et al. | 219/10.55 B |
| 4,504,895 | 3/1985 | Steigerwald | 363/132 |
| 4,587,604 | 5/1986 | Nerone | 363/17 |
| 4,593,167 | 6/1986 | Nilssen | 219/10.55 B |
| 4,620,078 | 10/1986 | Smith | 219/10.55 B |
| 4,648,017 | 3/1987 | Nerone | 363/17 |
| 4,672,159 | 6/1987 | Nilssen | 219/10.54 B |
| 4,672,528 | 6/1987 | Park et al. | 363/17 |
| 4,712,170 | 12/1987 | Grace | 363/98 |

*Primary Examiner*—Patrick R. Salce
*Assistant Examiner*—Jeffrey Sterrett
*Attorney, Agent, or Firm*—H. Neil Houser; Radford M. Reams

[57] ABSTRACT

A microwave heating system uses a magnetron powered by a full wave full bridge inverter. The magnetron has its power output stabilized against variations which might be caused by fluctuations in the AC input line. The inverter powers the magnetron by way of a power transformer having a primary and a secondary. The current is sensed in the primary in order to change the switching frequency of the inverter. As the current in the primary will depend upon fluctuations in the AC input line voltage, sensing of the current in the primary may be used to sense variations in the voltage of the AC input line. Alternately, current in the secondary of the power transformer may be sensed and used to detect variations in the AC input line voltage. In either case, the sensed variations in AC input line voltage are used to change the inverter frequency. Because the secondary includes a series resonant tuned circuit, changes in the difference between the inverter switching frequency and the resonant frequency of the tuned circuit may be used to counteract AC input line variations and stabilize the magnetron output power.

24 Claims, 4 Drawing Sheets

MAGNETRON WITH FREQUENCY CONTROL FOR POWER REGULATION

CROSS-REFERENCE TO RELATED APPLICATIONS

This application discloses and claims subject matter related to the subject matter disclosed and claimed in the following related applications, which applications are filed concurrently herewith and are hereby incorporated by reference:

"MAGNETRON WITH FULL WAVE BRIDGE INVERTER", Ser. No. 138,138;

"FILAMENT POWER COMPENSATION FOR COOKING MAGNETRON", Ser. No. 138,136;

"MAGNETRON WITH TEMPERATURE PROBE ISOLATION", Ser. No. 138,714;

"MAGNETRON WITH MICROPROCESSOR POWER CONTROL", Ser. No. 138,137;

"MAGNETRON WITH MICROPROCESSOR BASED FEEDBACK CONTROL", Ser. No. 138,139.

These applications, which were filed in the name of Peter Smith, with "FILAMENT POWER COMPENSATION FOR COOKING MAGNETRON" also naming Flavian Reising, Jr. and Thomas R. Payne as additional co-inventors, are assigned to the assignee of the present application.

BACKGROUND OF THE INVENTION

This invention relates to a microwave heating system used as a heating magnetron and, more particularly, to such a system having an arrangement to stabilize the output power of the magnetron against fluctuations which might be caused by variations in line voltage of an AC input line.

Microwave ovens commonly use 60 Hz LC power supply systems. Such power supply systems energize cooking magnetrons and exhibit very good regulation of magnetron current relative to line voltage. That is, the magnetron current (and therefore the magnetron power) stays relatively stable independent of variations in the line voltage of the AC input line powering the microwave oven. Such power supply systems have a transformer which allows the secondary to saturate the core by means of the positioning of a magnetic shunt within the main core. The saturation of the secondary maintains its voltage substantially constant. As the relationship between the magnetron plate voltage and plate current is generally linear for a magnetron which is operating to generate microwave power, the constant voltage at the secondary maintains a constant magnetron current and, therefore, the magnetron generates a constant power. This is of course true only if the working impedance of the magnetron load remains constant.

The ability of LC power supply systems to provide this stabilization of magnetron power against fluctuations due to variations in line voltage without complex additional circuits is one of many reasons that such power supply systems have been almost universally used in commercially available microwave ovens. However, such LC power supply systems have had disadvantages such as the need for a relatively large, heavy, and expensive power transformer.

One problem which has hindered the implementation of alternatives to the LC power supply systems is the need to regulate magnetron current against fluctuations due to line voltage variations. Alternates to the LC power supply system may not allow the use of the same mechanism to stabilize magnetron current and magnetron power. For example, one might use a high frequency inverter for powering a microwave oven, a relatively low cost transformer employing two "E" cores and one main winding assembly of secondary wound tightly on the primary. However, this would not usually permit the placement of a magnetic shunt or allow the secondary to saturate the core without causing saturation of the primary. Saturation of the primary is of course unacceptable. Further, the additional cost of adding a magnetic shunt to a high frequency core and associated increased size, additional weight, and great difficulty in maintaining leakage value tolerance in production all are serious obstacles to the regulation of magnetron current by saturation of a secondary in a high frequency inverter power supply.

Accordingly, it is a primary object of the present invention to provide a new and improved technique of magnetron power regulation.

A more specific object of the present invention is to provide an inverter driven magnetron power supply with efficient stabilization of the magnetron power output.

SUMMARY OF THE INVENTION

The present invention relates to a microwave heating system having an inverter, preferably a full wave full bridge inverter including four controlled switches, which is powered from an AC input line. A power transformer has a primary which receives power from the inverter and a secondary which supplies power to a heating magnetron. A control circuit controls power flow from the inverter to the magnetron. The control circuit includes an oscillator which supplies gate pulses to switch the four switches of the inverter at a switching frequency. Quite importantly, the present system includes a sensing means for sensing variations in line voltage of the AC input line and a frequency determining means connected to the oscillator for determining the switching frequency. The frequency determining means is connected and responsive to the sensing means to change the switching frequency an amount which is dependent upon the variation in line voltage of the AC input line. This change in frequency maintains the power output of the magnetron relatively stable and independent of variations in line voltage of the AC input line.

The sensing means may include a sensing resistor which is in circuit between the AC line and the primary to develop a voltage across it which is representative of current through the primary, this voltage varying with variations in line voltage of the AC input line. A peak capacitor may store a peak voltage across the sensing resistor and an amplifier may compare the peak voltage to a reference voltage, the amplifier having an output which changes the switching frequency. An alternate embodiment uses a current transformer as the sensing means, the current transformer sensing current in the secondary of the power transformer.

The frequency determining means, preferably a current mirror, determines switching frequency over a continuous range between a lower switching frequency and an upper switching frequency. As the secondary of the power transformer and a capacitor of a voltage doubling circuit are part of a tuned circuit having a resonant frequency not greater than the lower switching frequency, the change in frequency of the inverter in turn adjusts the power of the magnetron. By making these changes in frequency dependent upon changes in line voltage, the magnetron power output is stabilized against fluctuations which might otherwise be caused by variations in line voltage of the AC input line.

BRIEF DESCRIPTION OF THE DRAWINGS

The above and other objects and features of the present invention will be more readily understood when the following detailed description is considered in conjunction with the accompanying drawings wherein like characters represent like parts throughout the several views and in which.

DETAILED DESCRIPTION

Figure 1:
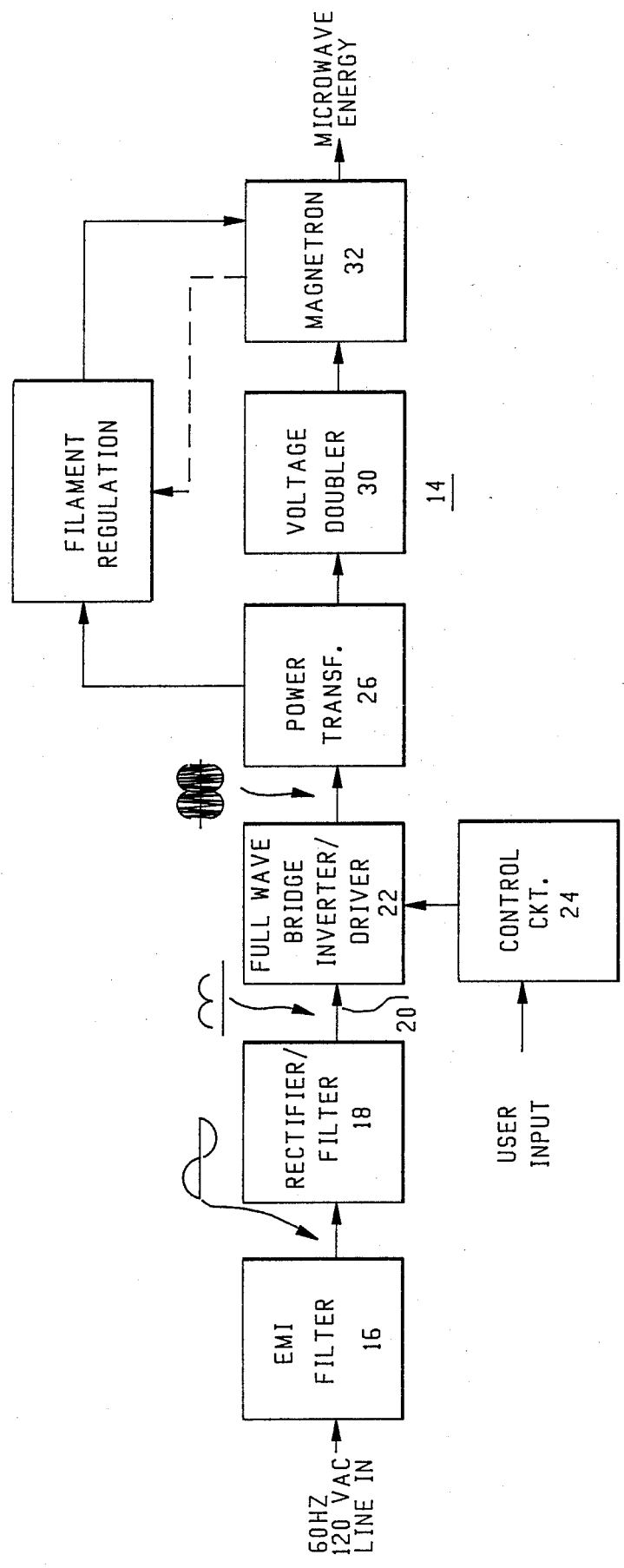
FIG. 1 shows a block diagram of the present cooking system.

As shown in FIG. 1, the cooking system 14 of the present invention includes an electromagnetic interference (EMI) filter 16 which receives AC input as illustrated. A rectifier/filter circuit 18 receives its 120 volt 60 Hz input by way of the EMI filter 16. The rectifier/filter 18 supplies a bulk DC signal on line 20 to a full wave full bridge inverter/driver 22. The inverter/driver 22 is controlled by a control circuit 24 such that it supplies power to a power transformer 26. The control circuit 24 receives an input from a frequency adjusting circuit 28 which in turn receives an input from the rectifier/filter circuit 18. The frequency adjust circuit 28 causes the control conduit 24 to change the switching frequency of the inverter/driver 22 such that a different frequency of power is supplied to the power transformer 26. The power transformer 26 supplies power through a voltage doubler circuit 30 to a magnetron 32.

An overview of the basics of the operation of the present invention may be useful at this stage. As the line voltage supplied to the rectifier/filter circuit 18 by way of EMI filter 16 fluctuates, the power supplied to the power transformer 26 similarly fluctuates. Accordingly, this normally would have the tendency to change the power output of the magnetron 32. However, in accordance with the present invention, the frequency adjust circuit 28 is used to sense variations in the input line voltage and to change the switching frequency of the inverter/driver 22 so as to counteract variations in the magnetron power output.

Figure 2:
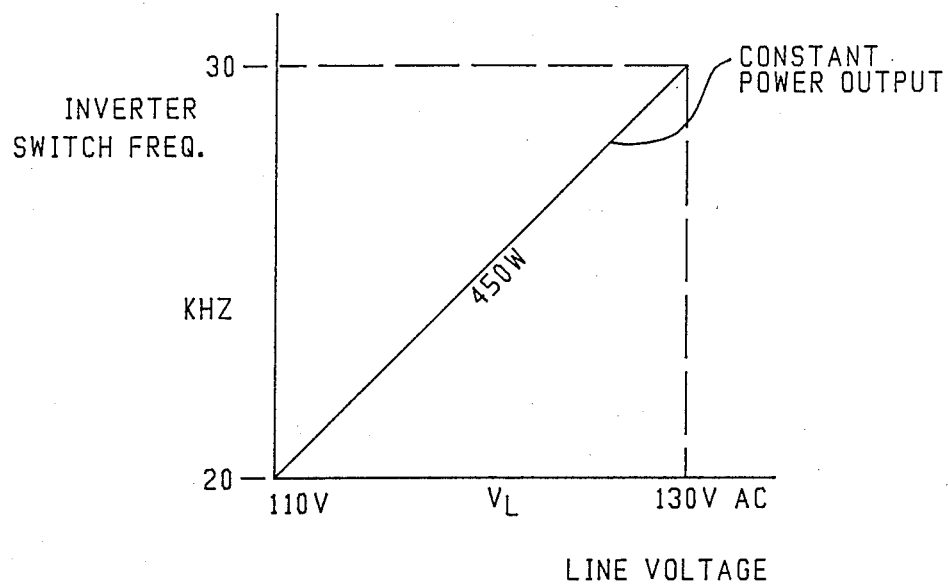
FIG. 2 shows a graph illustrating a relationship between inverter switching frequency and line voltage.

Advantageous use is made of the empirically demonstrated relationship between inverter switching frequency and line voltage illustrated in FIG. 2. As shown, over at least a predetermined range of switching frequencies, there is an essentially linear relationship between switching frequency and line voltage for constant magnetron output power. In the illustrative embodiment a line voltage of 120 volts and switching frequency of 25 KHz, establishes a magnetron output power of 450 watts. Should the line voltage increase to 130 volts, the magnetron output power can be maintained essentially constant at 450 watts by increasing the switching frequency to 30 KHz. Similarly, for a decrease in line voltage to 110 volts, the output power of 450 watts is maintained by decreasing the switching frequency to 20 KHz.

As presently understood, this relationship between switching frequency, line voltage, and magnetron output power is believed due to the presence of a tuned LC circuit in the secondary of the power transformer essentially comprising the capacitor in the voltage doubler circuit and the leakage inductance of the secondary winding. This tuned circuit is characterized by a resonant frequency which is less than the minimum inverter switching frequency. The variation in line voltage is compensated for by varying the difference between the switching frequency of the inverter circuit and the resonant frequency. Referring to the previous example, an increase in line voltage would normally be expected to increase the magnetron output power. However, increasing the switching frequency increases the difference between switching frequency and resonant frequency. Consequently, the additional input power resulting from the increase in line voltage is dissipated in the increased impedance presented by the tuned circuit being further off resonance and the power to the magnetron remains essentially unchanged. Similarly, a decrease in line voltage by moving the switching frequency closer to the resonance frequency, resulting in less impedance and less power loss in the tuned circuit resulting in more output power from the magnetron.

A specific embodiment of the present invention will be discussed with reference to FIG. 3. The diodes 18R constitute a bridge rectifier which receives AC input from the EMI filter (EMI filter 16 now shown in FIG. 3). Connected to the diodes 18R is a filtering capacitor 18C which may be connected in parallel with a high value resistor 18S. Although alternate arrangements could be used for filtering the output of the rectifier diodes 18R, these are not central to the present invention and need not be discussed in detail.

The voltage across capacitor 18C is a bulk DC (i.e., DC with substantial ripple such as DC varying between 30 volts and 165 volts at 120 Hz) signal which is applied between line 42 and the signal ground and supplied to the inverter/driver 22. The inverter includes four power MOSFETs 46F, 46S, 46T, and 46R. These transistors serve as controlled switches (i.e., meaning that they have one control terminal and at least two other terminals) which are opened and closed in pairs to apply an AC signal across lines 48 and 50.

It should be noted that each of the transistors 46F, 46S, 46T, and 46R has a diode 58 in parallel with it for protection purposes. If desired, a zener diode could also be used in parallel with each of the diodes 58 for voltage limiting purposes. Such protective zener diodes, not shown, could also be used to limit the voltage from the gate to drain of the transistors 46S and 46R. Series combinations of reverse-bias zener diodes, also not shown, could be used for protection purposes by placement in parallel with secondaries 54F and 54S and placement in parallel with primary 60.

Figure 3:
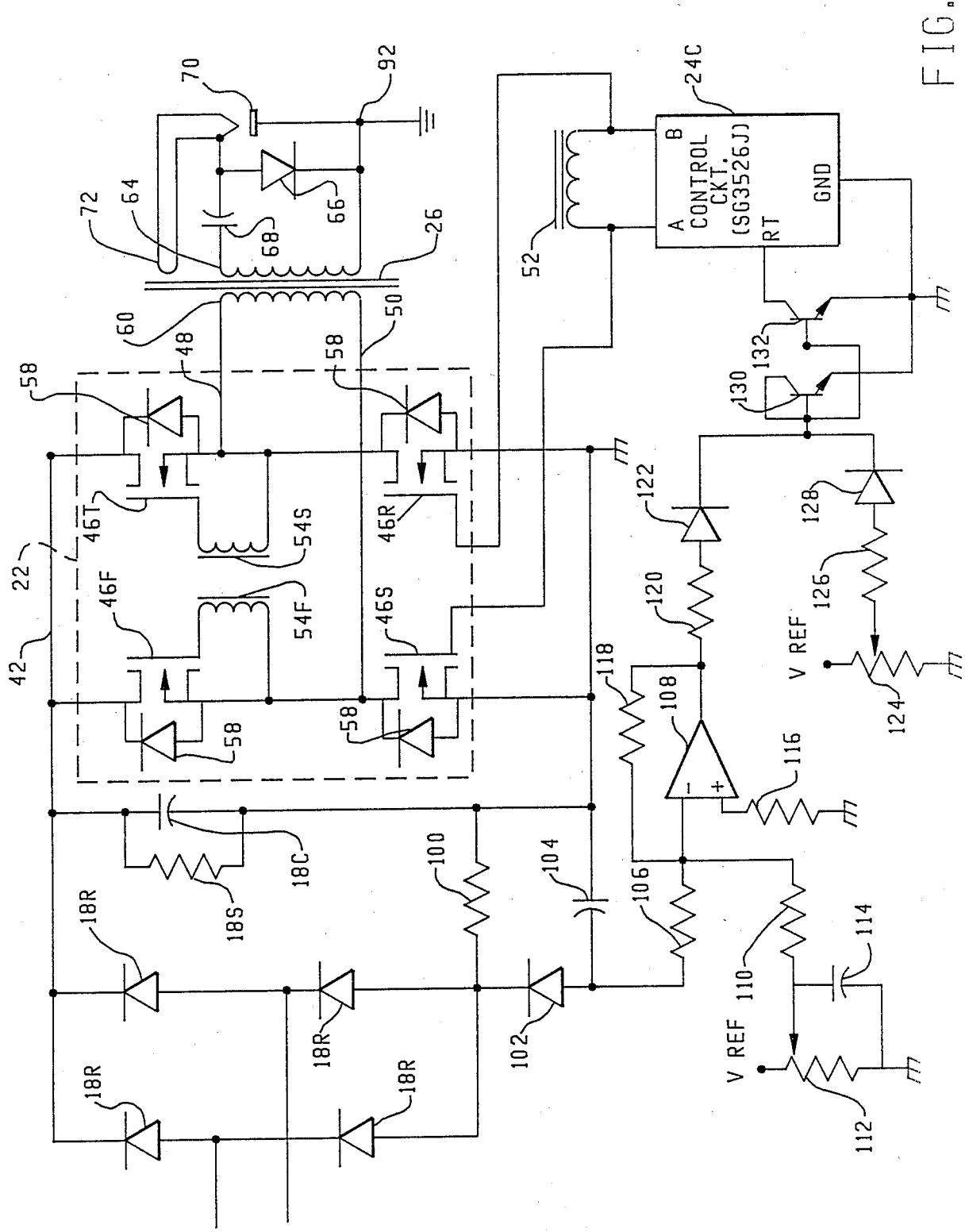
FIG. 3 shows a simplified schematic of parts of the present system.

As shown in FIG. 3, the control circuit 24 includes a Silicon General chip SG3526J designated 24C. That chip provides two complementary outputs A and B which are applied directly to the gates of transistor switches 46S and 46R and which are applied to the gates of transistors 46F and 46T by way of an isolation transformer having primary 52 and secondaries 54F and 54S. When the transistors 46F and 46R are closed, the transistors and 46S and 46T are open. Likewise, when the transistors 46S and 46T are closed, the other two transistors are open. The control circuit preferably provides a dead zone which insures that one pair of transistors will be fully open before the other pair of transistors are closed.

The switching of the transistors causes an AC signal to be applied to the primary 60 of power transformer 26. In turn, power is supplied from the secondary 64 to a voltage doubling circuit having diode 66 and capacitor 68. The voltage from the doubling circuit is applied to magnetron 70 which has its filament supplied from a filament winding 72 on the power transformer 26. The secondary 64 of the power transformer 26 is connected to a line ground 92 in contrast to the signal ground connected to the drains of transistors 46S and 46R.

Most importantly, the secondary circuit of power transformer 26 constitutes a tuned series resonant circuit having a high Q, the resonant frequency being at approximately 19 KHz. The resonant frequency will be determined by the value of the capacitor 68, the mutual inductance between secondary 64 and primary 60, and the parasitic capacitance of the transformer 26 as will be readily appreciated by those of skill in the art. As an example, the transformer 26 might be specified as follows: coil—Balser 20471-001, core—stackpole #50-0341 (National-cermag 248,0244), with a 2.5 mil gap. The primary 60 might have 22 turns and the secondary 64 have 480 turns, whereas the capacitor 68 could be an Elmac #P701 with a value of 0.005 microfarads. The selection of these or other values of components to provide a resonant frequency of 19 KHz will of course be apparent to those of skill in this art.

The arrangement which in accordance with the present invention moves the inverter switching frequency relative to the resonant frequency of the tuned secondary circuit to compensate for line voltage variations is shown with further reference to FIG. 3. In particular, a current sensing resistor 100 senses the current through the primary 60. That is, the voltage across resistor 100 depends upon the current through the alternately closing pairs of the transistors 46F, 46S, 46T, and 46R, which current also travels through the primary 60. That current will vary in response to variations in the line voltage of the AC input line. The diode 102 allows the capacitor 104 to store the peak value of the voltage across resistor 100. By positioning the current sensing resistor 100 between the rectifier diode 18R and the filtering capacitor 18C, the filter 18C attenuates the low and high frequency components in the current sensed by resistor 100 created by the high frequency switching of the inverter 22. The peak voltage of resistor 100, corresponding to the peak rectified line current, is supplied by capacitor 104 to resistor 106 and amplifier 108.

Amplifier 108 together with input resistors 106, 110, bias resistor 116, and feedback resistor 118 are configured as a difference amplifier circuit, with the junction of input resistors 106 and 110 connected to the inverting input of amplifier 108, feedback resistor 118 connected between the output of amplifier 108 and its inverting input, and the non-inverting input connected to signal ground via resistor 116. The output of amplifier 108 is proportional to the difference between the voltage at the junction of diode 102 and resistor 104, and the voltage at the junction of resistors 110 and 112. The voltage at the junction of resistor 106 and diode 102 as described above is proportional to the current through resistor 100. The voltage at the intersection of resistors 110 and 112 represents the set point voltage for the maximum magnetron output power at the nominal line voltage. This set point voltage is established by proper setting of variable calibration resistor 112, which is connected between a reference voltage source and signal ground in parallel with bypass capacitor 114. This reference voltage establishes the proper voltage differential at the input to amplifier 108 to provide the appropriate switching frequency for the maximum output power at nominal line voltage. The output of amplifier 108 is supplied by way of resistor 120 to a diode 122. Diode 122 cooperates with a variable resistor 124, resistor 126, and diode 128 to realize an "OR" circuit such that the node common to diodes 122 and 128 will be at a voltage corresponding to the higher of the output of amplifier 108 or a minimum frequency reference voltage supplied from the setting on variable resistor 124. That is, the variable resistor 124 may be set to establish a minimum frequency for the inverter switching frequency; and the "OR" circuit established by diodes 122 and 128 allows the minimum frequency to be used if the current sensed by resistor 100 would otherwise tend to lower the frequency below the established minimum.

The output of the diodes 122 and 128 is supplied to a current mirror transistor circuit established by bipolar transistors 130 and 132. The transistor 132 is connected to port RT of control circuit chip 24C corresponding to the connection for the timing resistor. By this arrangement, the current in transistor 132 controls the current controlled drain in the internal frequency determining network of chip 24C. The current through transistor 132 will therefore determine the frequency of the alternate pulses supplied at outputs A and B of control circuit 24, these outputs in turn determining the switching frequency of the inverter.

The circuit of FIG. 3 represents a closed feedback loop which tends to stabilize the current through resistor 100. Since the current through resistor 100 depends upon the load drawn by magnetron 70 in the secondary transformer 26, the feedback loop will correspondingly stablilize the output power of the magnetron 70. For example, if the line voltage increases, the current sensed by resistor 100 will increase, leading to an increase in the output of amplifier 108. The increase in the output of amplifier 108 will in turn change the current flowing through transistor 132 (by way of transistor 130). The change in current in transistor 132 changes the output frequency of the control circuit 24 and in turn changes the switching frequency of the inverter 22. The switching frequency of inverter 22 would be increased for an increase in line voltage. (The switching frequency would be decreased for a decrease in line voltage to bring the switching frequency closer to the 19 KHz resonant frequency.) The increase in the switching frequency would move the frequency of the voltage signal across secondary 64 further away from the resonant frequency of the tuned circuit in the secondary. Therefore, the voltage applied to the magnetron 70 would be lowered sufficiently to counteract the increase which would otherwise be caused by the line voltage increase. The change of the switching frequency away from the resonant frequency of the secondary circuit in turn causes the primary 60 of power transformer 26 to see a higher load impedance and, therefore, to draw less current until the current through sensing resistor 100 has stabilized. The current mirror comprising transistors 130 and 132 serve as a frequency determining means in that the current through transistor 132 determines the frequency out of control circuit 24 and, therefore, the inverter switching frequency. In practice, the frequency of the inverter could be varied between 20 KHz and 30 KHz when the resonant frequency of the tuned circuit is 19 KHz.

In the illustrative embodiment, frequency control is used only for power regulation. However, it will be appreciated that the frequency control technique herein described could also be used for power control over the range of the linear relationship between frequency and line voltage. An example of using frequency control for power control is described in the hereinbefore referenced patent application Ser. No. 138,137.

For purposes of the illustrative embodiment herein described, duty cycle control is employed with a duty cycle on the order of 7-15 seconds as is commonly used in conventional microwave oven power control circuits.

Figure 4:
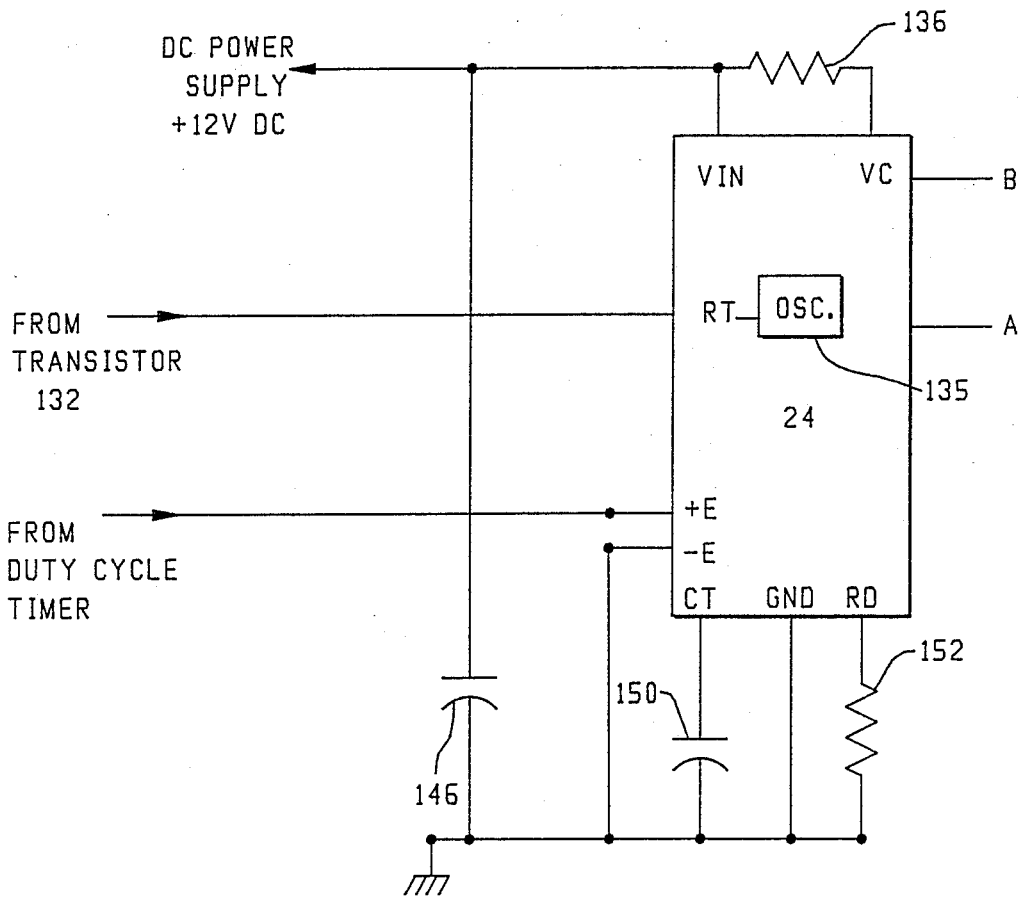
FIG. 4 shows a simplified schematic of some parts of the present system.

FIG. 3 leave out some of the connections for control circuit chip 24 to avoid overcomplicating that diagram. Other possible connections for the control circuit chip 24 are shown in FIG. 4 and include DC power supplied by way of resistor 136. The chip 24C, which as noted previously is preferably a SG3526J chip, includes an internal sawtooth oscillator 135 which establishes the frequency of the output signal at A and B according to the inputs at RT, RD, and $C_T$. Capacitor 146 extends across the 12 volt input which may be supplied from an appropriately connected zener diode (not shown) from the signal on line 42 of FIG. 3. Timing capacitor 150, connected between port $C_T$ and ground, together with the current at port "$R_T$", determines the frequency of oscillator 135. Resistor 152, connected between port RD and ground determines the dead zone (slight delay between the end of a pulse at output A or output B and the start of a pulse at the opposite output).

For power control, a separate timing circuit responsive to user input power level selection (not shown) which may be of well known conventional design may be used to generate the ON/OFF duty cycle control signal. This signal controls the duration of the ON and OFF periods for the inverter circuit to vary the output power of the magnetron according to the user selected power setting. This control signal can be applied to the E+ input port of chip 24C. A logic high signal at E+ inhibits the output signals at outputs A and B effectively turning the inverter off. A logic low signal at E+ enables the output signals at A and B turning the inverter on.

Figure 5:
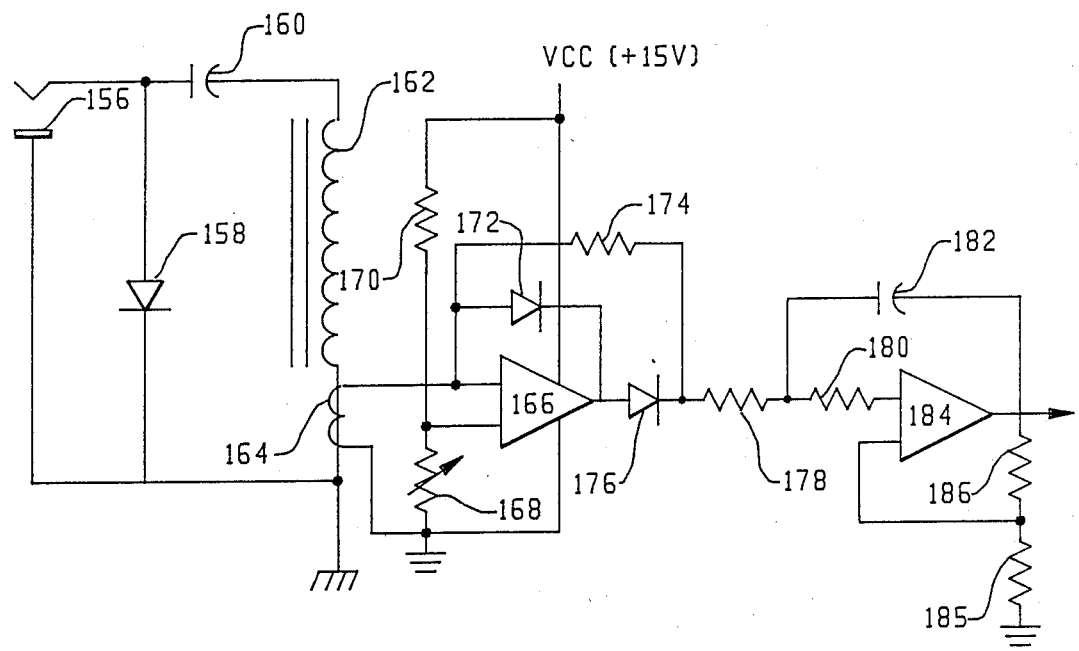
FIG. 5 shows a schematic of an alternate arrangement of parts of the present invention.

FIG. 5 shows an alternate feedback loop which could be used with the present invention. In particular, the magnetron 156 receives voltage from a voltage doubling circuit comprising diode 158 and capacitor 160. The doubling circuit is connected to a secondary 162 of a power transformer. Other than the secondary 162, the rest of the power transformer need not be shown as the primary would be connected to an inverter as shown for the example of FIG. 3. In the embodiment of FIG. 5, the feedback loop uses a current transformer 164 which senses the current in the secondary. Operational amplifier 166 is connected to the current sensor 164 and operates as a precision detector with variable resistor 168 being used to set the maximum power by way of a voltage applied against a voltage divider including variable resistor 168 and resistor 170. The voltage divider supplies one input to amplifier 166, whereas the current transformer 164 supplies the other input. Diode 172 and resistor 174 extend from the input to the output of the amplifier 166, with diode 176 connected between the amplifier output and the output side of resistor 174. The output of the precision detector realized by amplifier 166 and its associated components is supplied to resistor 178 and a low pass filter realized by resistor 180, feedback capacitor 182, amplifier 184, and resistors 185 and 186. The low pass filter realized by amplifier 184 and its associated components filters out that component of the signal corresponding to the inverter switching frequency. The output of amplifier 184 is supplied to a current mirror like that realized by transistors 130 and 132 in FIG. 3, the current mirror serving as a frequency determining means for a control circuit chip like chip 24 of FIG. 3.

Figure 6:
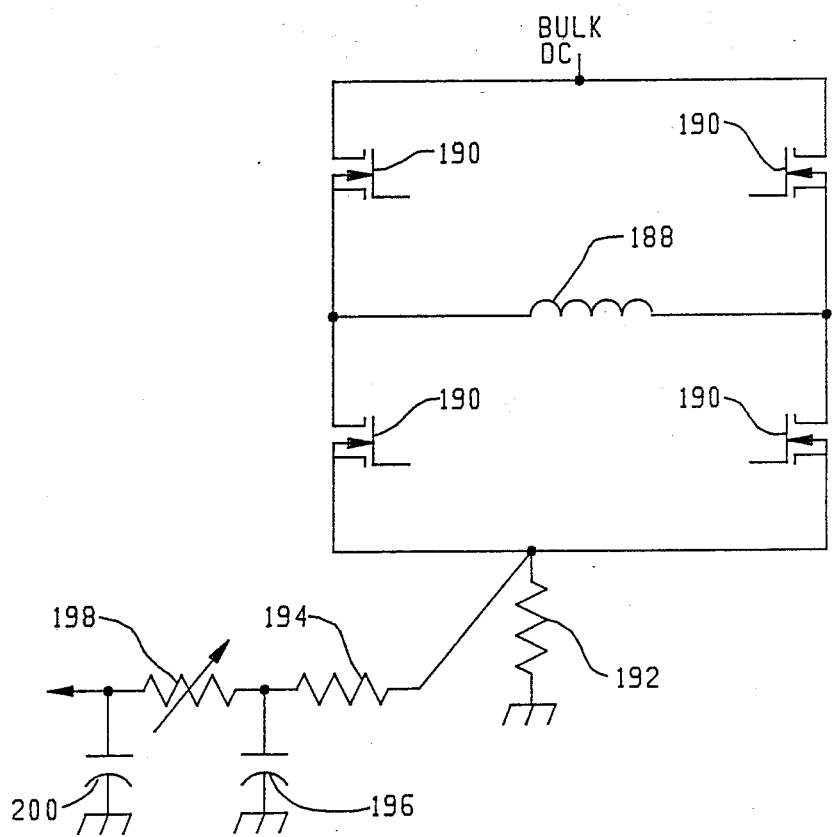
FIG. 6 shows another alternate arrangement of parts of the present invention.

A third embodiment feedback arrangement is shown in simplified fashion in FIG. 6. In particular, FIG. 6 shows a power transformer primary 188 which is supplied AC by an inverter having switching transistors 190. For ease of illustration, the gate connections and other details have been left out for FIG. 6. Likewise, the parts of the power transformer other than primary 188 need not be illustrated as they would be identical to those shown in the secondary of FIG. 3. In the embodiment of FIG. 6, a current sensing resistor 192 is disposed between the drains of the lower switching transistors and the signal ground. The voltage across this sensing resistor 192 would therefore correspond to the current through the primary 188 and would be dependent upon the variations in the AC input line. The current sensing resistor 192 is connected to an integrating circuit comprising resistor 194, capacitor 196, variable trim resistor 198, and capacitor 200. This circuit integrates the signal over ten cycles and provides an output at the common node between capacitor 200 and variable resistor 198 which would be supplied to a current mirror (not shown in FIG. 6), the current mirror in turn controlling the frequency of an oscillator as hereinbefore described.

Either of the embodiments of FIG. 5 and FIG. 6 are based upon the same general concept of operation as the embodiment of FIG. 3. That is, a signal which would vary with fluctuations of AC input line voltage is sensed and is used to determine the frequency of the inverter. When the AC input line voltage has a variation, the magnetron output power is maintained relatively constant by changing the inverter switching frequency such that any tendency in the line voltage variation to induce a change in the magnetron output power is counteracted by moving the inverter switching frequency toward or away from the resonant frequency of the tuned circuit comprising the power transformer's secondary winding inductance and the capacitor of the voltage doubling circuit.

It should be noted that the feedback arrangement of any of the embodiments of the present invention is highly advantageous in that the control circuit chip 24C (shown in FIG. 3) would be used in each. Because use of a control circuit having an oscillator for controlling the switching of the inverter would be required in any inverter arrangement, the present approach advantageously provides power regulation with a relatively small number of additional components. For example, and with reference to FIG. 3, that feedback approach only requires the components labeled with numbers between 100 and 132 in order to provide the feedback for magnetron power output stabilization.

Although various specific details have been provided in the present description, it is to be understood that these are for illustrative purposes only. Various modifications and adaptations will be readily apparent to those of skill in the art. Accordingly, the spirit and scope of the present invention should be determined with reference to the claims appended hereto.

What is claimed is:

1. A power control system for a microwave heating apparatus comprising:
   a variable frequency inverter circuit energized by voltage applied to its input from an external AC power supply;
   a power transformer having a primary winding connected to receive power from said inverter and a secondary winding;
   a magnetron;
   a voltage doubler circuit for coupling power from said secondary winding to said magnetron, said voltage doubler circuit and said secondary winding comprising a tuned LC circuit characterized by a predetermined resonant frequency;
   frequency control means for varying the frequency of the output from said inverter circuit applied to said primary between predetermined minimum and maximum frequencies, said minimum frequency being greater than said resonant frequency;
   means for sensing variations in the input voltage applied to said inverter circuit from said external AC supply;
   said frequency control means being responsive to said sensing means and operative to vary the frequency of said inverter output signal as a function of variations in said input voltage so as to maintain relatively constant magnetron output power as a result of changes in the difference between the frequency of the said inverter output signal and said resonant frequency.

2. The power control system of claim 1 wherein said inverter circuit, voltage doubler circuit, and magnetron are collectively characterized by a relatively linear relationship between line voltage and inverter output frequency over the range of frequencies bounded by said predetermined minimum and maximum frequencies, for constant magnetron output power.

3. The power control system of claim 1 wherein said sensing means includes a sensing resistor, said sensing resistor being in circuit between said AC line and said primary, and said sensing resistor has a voltage across it which is representative of current through the primary and which varies with variations in line voltage of said AC input line.

4. The power control system of claim 3 wherein said sensing means further includes a peak capacitor for storing a peak voltage across said sensing resistor, and said power control system further comprises an amplifier for comparing the peak voltage to a reference voltage and wherein said amplifier has an output which changes the switching frequency determined by frequency determining means.

5. The power control system of claim 4 further comprising a bridge rectifier and a filter, both said bridge rectifier and said filter being disposed between said AC line and said inverter, and wherein said sensing resistor is between said bridge rectifier and said filter.

6. The power control system of claim 1 wherein said sensing means is a current transformer for sensing current in said secondary.

7. A power control system for microwave heating apparatus comprising:
   an inverter having a plurality of switches and being powered from an AC input line, each of the plurality of switches being a controlled switch;
   a power transformer having a primary connected to receive power from said inverter and a secondary;
   a heating magnetron connected to receive power from said secondary;
   a control circuit for controlling power flow from said inverter to said magnetron, said control circuit having an oscillator for supplying gate pulses to switch said plurality of switches of said inverter at a switching frequency;
   sensing means for sensing variations in line voltage of said AC input line; and
   frequency determining means connected to said oscillator for determining the switching frequency, said frequency determining means being connected and responsive to said sensing means to change the switching frequency an amount which is dependent upon the variation in line voltage of said AC input line; and
   wherein said secondary of said power transformer is part of a tuned circuit having a resonant frequency and wherein said frequency determining means changes a difference between the switching frequency and the resonant frequency to minimize fluctuations in the power output of said cooking magnetron, which fluctuations would otherwise be caused by variations in line voltage of said AC input line and wherein said secondary of said power transformer is connected to a voltage doubling circuit having a capacitor and diode and connected to supply high voltage to said magnetron, and wherein said capacitor is part of said tuned circuit.

8. The power control system of claim 7 wherein said sensing means includes a sensing resistor, said sensing resistor being in circuit between said AC line and said primary, and said sensing resistor has a voltage across it which is representative of current through the primary and which varies with variations in line voltage of said AC input line.

9. The power control system of claim 8 wherein said sensing means further includes a peak capacitor for storing a peak voltage across said sensing resistor.

10. The power control system of claim 9 wherein said frequency determining means comprises a current mirror.

11. The power control system of claim 10 further comprising an amplifier having an output dependent on the difference between a peak voltage across said sensing resistor and a reference voltage and wherein said current mirror is connected to receive said output.

12. The power control system of claim 11 further comprising a bridge rectifier and a filter, both said bridge rectifier and said filter being disposed between said AC line and said inverter, and wherein said sensing means is between said bridge rectifier and said filter.

13. The power control system of claim 12 wherein said frequency determining means determines the switching frequency over a continuous range between a lower switching frequency and an upper switching frequency and wherein said inverter is a full wave full bridge inverter having four switches in said plurality of switches, and wherein said resonant frequency is not greater than said lower switching frequency.

14. The power control system of claim 7 wherein said sensing means is a current transformer for sensing current in said secondary.

15. A power control system for a microwave heating apparatus comprising;
   a full wave full bridge inverter powered from an AC input line and including four switches, each switch being a controlled switch, a first switch and a second switch of said four switches being connected in series, a third switch and a fourth switch of said four switches being connected in series;
   a power transformer having a primary connected to receive power from said inverter and a secondary, said primary being connected between a node common to said first and second switches and a node common to said third and fourth switches;
   a heating magnetron connected to receive power from said secondary;
   a control circuit for controlling power flow from said inverter to said magnetron, said control circuit having an oscillator for supplying gate pulses to switch said four switches of said inverter at a switching frequency;
   sensing means for sensing variations in line voltage of said AC input line; and
   frequency determining means connected to said oscillator for determining the switching frequency, said frequency determining means being connected and responsive to said sensing means to change the switching frequency an amount which is dependent upon the variation in line voltage of said AC input line such that the power output of said cooking magnetron is maintained relatively stable and independent of variations in line voltage of said AC input line and;
   wherein said frequency means determines the switching frequency over a continuous range between a lower switching frequency and an upper switching frequency, and wherein said secondary of said power transformer is part of a tuned circuit having a resonant frequency not greater than said lower switching frequency and wherein said frequency determining means changes a difference between the switching frequency and the resonant frequency to minimize fluctuations in the power output of said cooking magnetron, which fluctuations would otherwise be caused by variations in line voltage of said AC input line.

16. The power control system of claim 15 wherein said secondary of said power transformer is connected to a voltage doubling circuit having a capacitor and diode and connected to supply high voltage to said magnetron, and wherein said capacitor is part of said tuned circuit.

17. The power control system of claim 15 wherein said frequency determining means includes a transistor and a signal from said transistor controls the switching frequency.

18. The power control system of claim 17 wherein said signal from said transistor is the current through said transistor.

19. The power control system of claim 18 wherein said frequency determining means comprises a current mirror, and said transistor is part of said current mirror.

20. A method of stabilizing a system with a heating magnetron against variations in power output of the heating magnetron due to variations in line voltage of an AC input line, the steps comprising:
   using power from the AC input line to power an inverter such that the inverter operates at a switching frequency;
   supplying power to a primary of a power transformer from the inverter;
   supplying power to a heating magnetron from a secondary of the power transformer;
   sensing variations in line voltage of the AC input line; and
   changing the switching frequency in an amount determined by the sensed variations such that the power output of the cooking magnetron remains relative constant as a result of changes in the difference between the switching frequency and a resonant frequency of a resonant circuit including said secondary.

21. The method of claim 20 wherein said inverter is a full wave full bridge inverter having four controlled switches such that said operating step includes the switching of four controlled switches at the switching frequency.

22. The method of claim 21 wherein said sensing step senses current in the primary.

23. The method of claim 22 further comprising the steps of:
   rectifying the AC on the AC input line by operation of a bridge rectifier;
   filtering a rectified signal from the bridge rectifier in a filter; and
   supplying the inverter with an output of the filter and;
   wherein the current in the primary is sensed between the bridge rectifier and the filter.

24. The method of claim 21 wherein said sensing step senses current in the secondary.

* * * * *

UNITED STATES PATENT AND TRADEMARK OFFICE
CERTIFICATE OF CORRECTION

PATENT NO. : 4,843,202

DATED : June 27, 1989

INVENTOR(S) : Peter H. Smith and Flavian Reising, Jr.

It is certified that error appears in the above-identified patent and that said Letters Patent is hereby corrected as shown below:

Column 11, line 36, after "frequency" insert --determining--.

Signed and Sealed this

Twenty-seventh Day of February, 1990

Attest:

JEFFREY M. SAMUELS

*Attesting Officer*  *Acting Commissioner of Patents and Trademarks*